Figure 3:
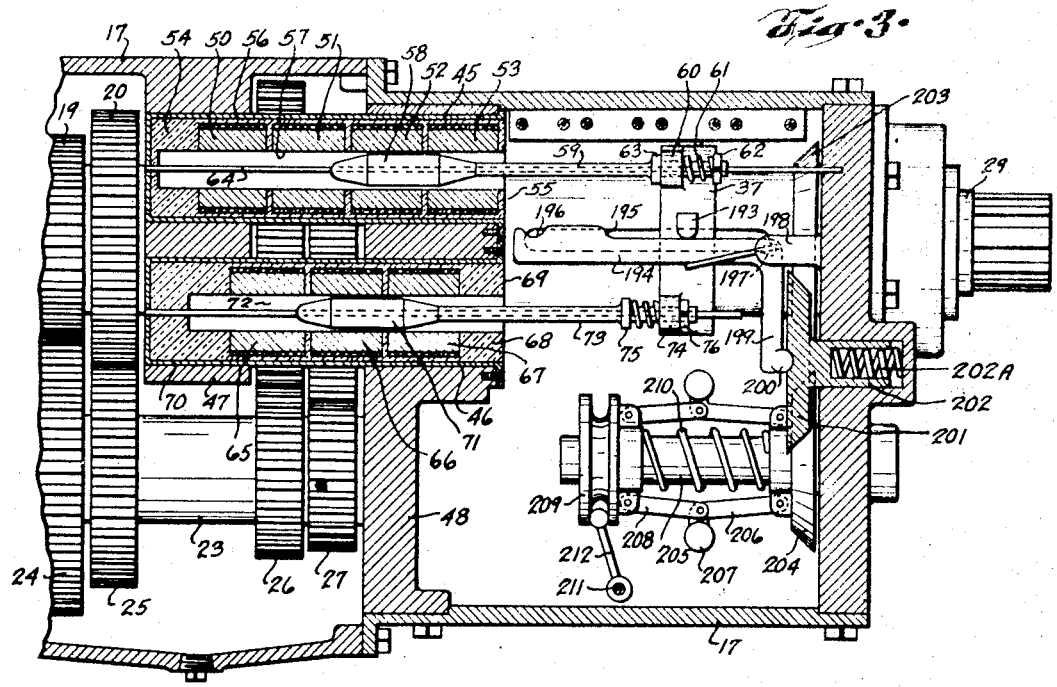

April 25, 1939.  E. S. BUSH  2,155,470
COMBINED CLUTCH AND TRANSMISSION CONTROL
Original Filed July 9, 1934   5 Sheets-Sheet 1
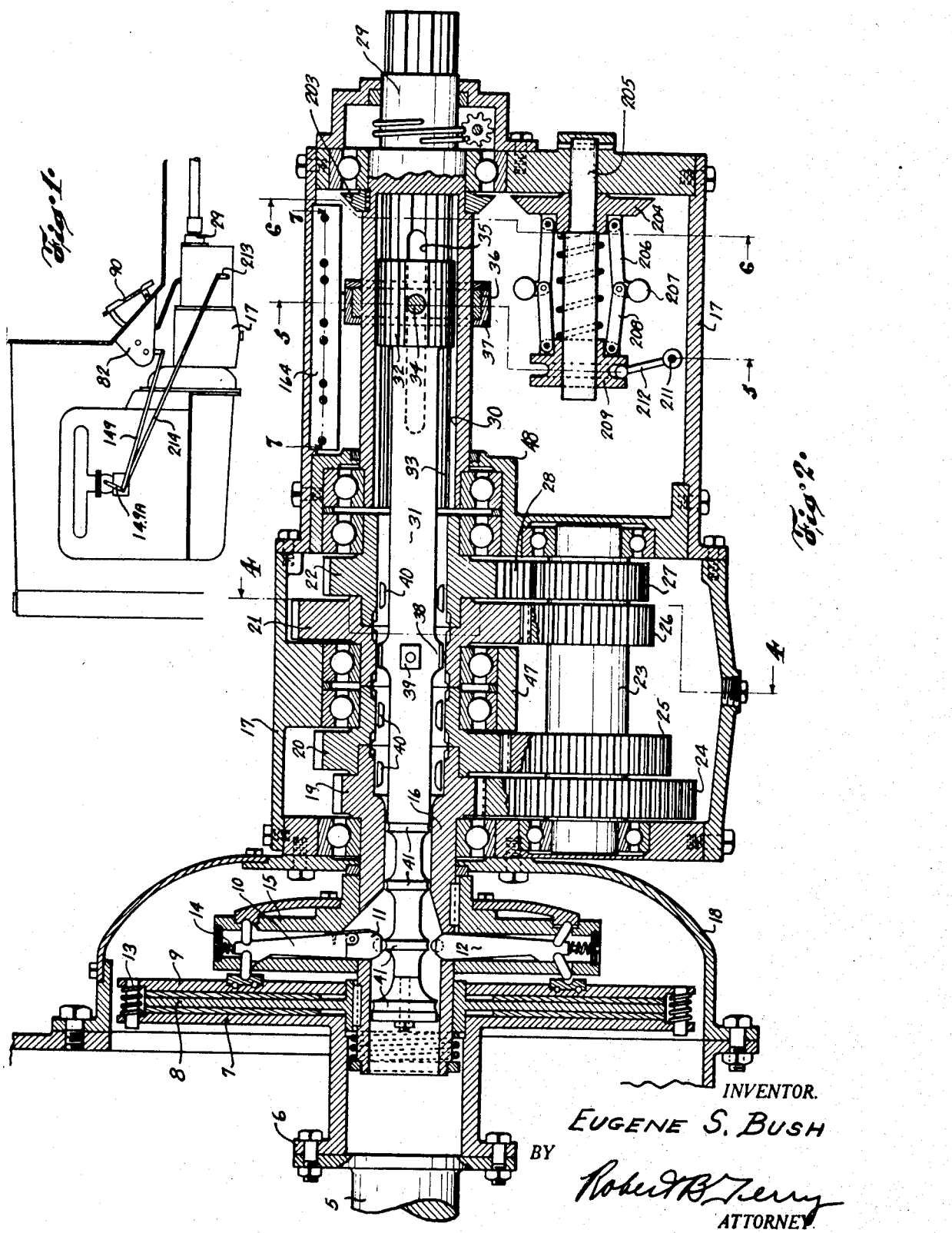
INVENTOR.
EUGENE S. BUSH
BY
ATTORNEY April 25, 1939. E. S. BUSH 2,155,470
COMBINED CLUTCH AND TRANSMISSION CONTROL
Original Filed July , 1934 5 Sheets-Sheet 2

INVENTOR.
EUGENE S. BUSH
BY Robert B. Terry
ATTORNEY

April 25, 1939.  E. S. BUSH  2,155,470

COMBINED CLUTCH AND TRANSMISSION CONTROL

Original Filed July 9, 1934   5 Sheets-Sheet 3

INVENTOR.
EUGENE S. BUSH
BY Robert B. Terry
ATTORNEY

April 25, 1939.  E. S. BUSH  2,155,470
COMBINED CLUTCH AND TRANSMISSION CONTROL
Original Filed July 9, 1934  5 Sheets-Sheet 4
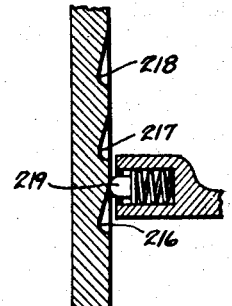
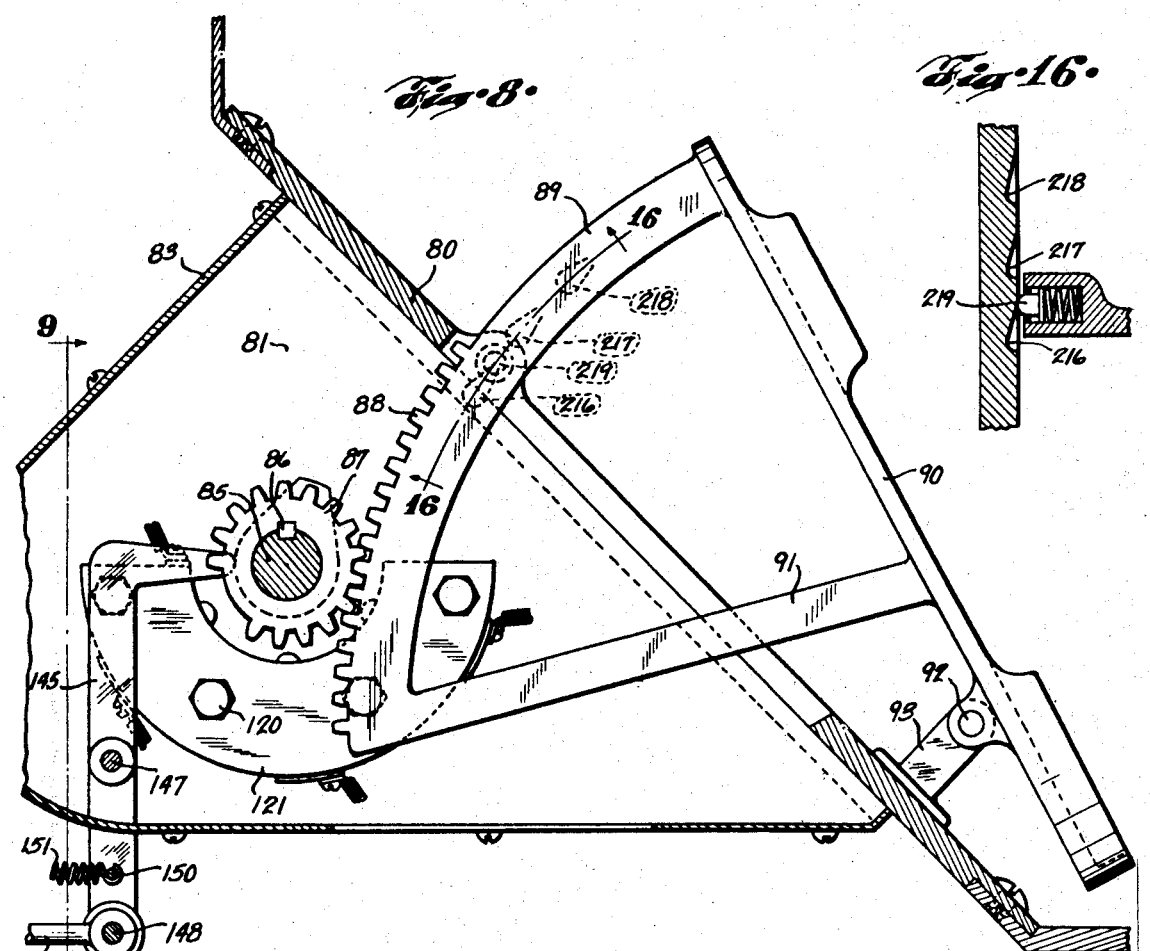
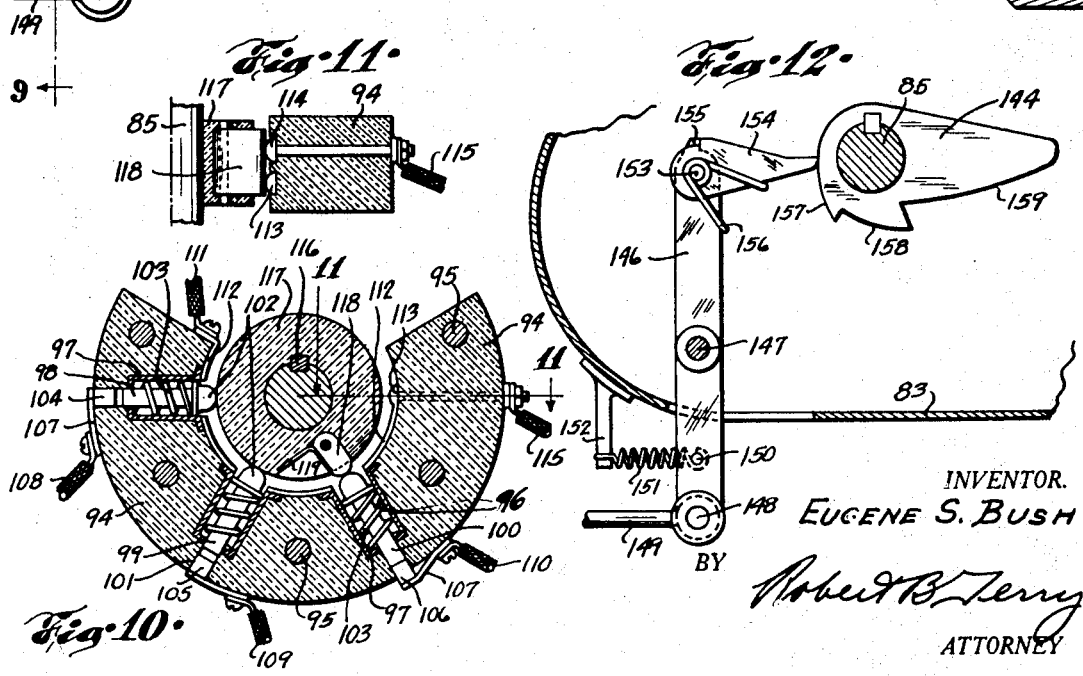
INVENTOR.
EUGENE S. BUSH
BY
Robert B. Terry
ATTORNEY April 25, 1939.  E. S. BUSH  2,155,470
COMBINED CLUTCH AND TRANSMISSION CONTROL
Original Filed July 9, 1934  5 Sheets-Sheet 5
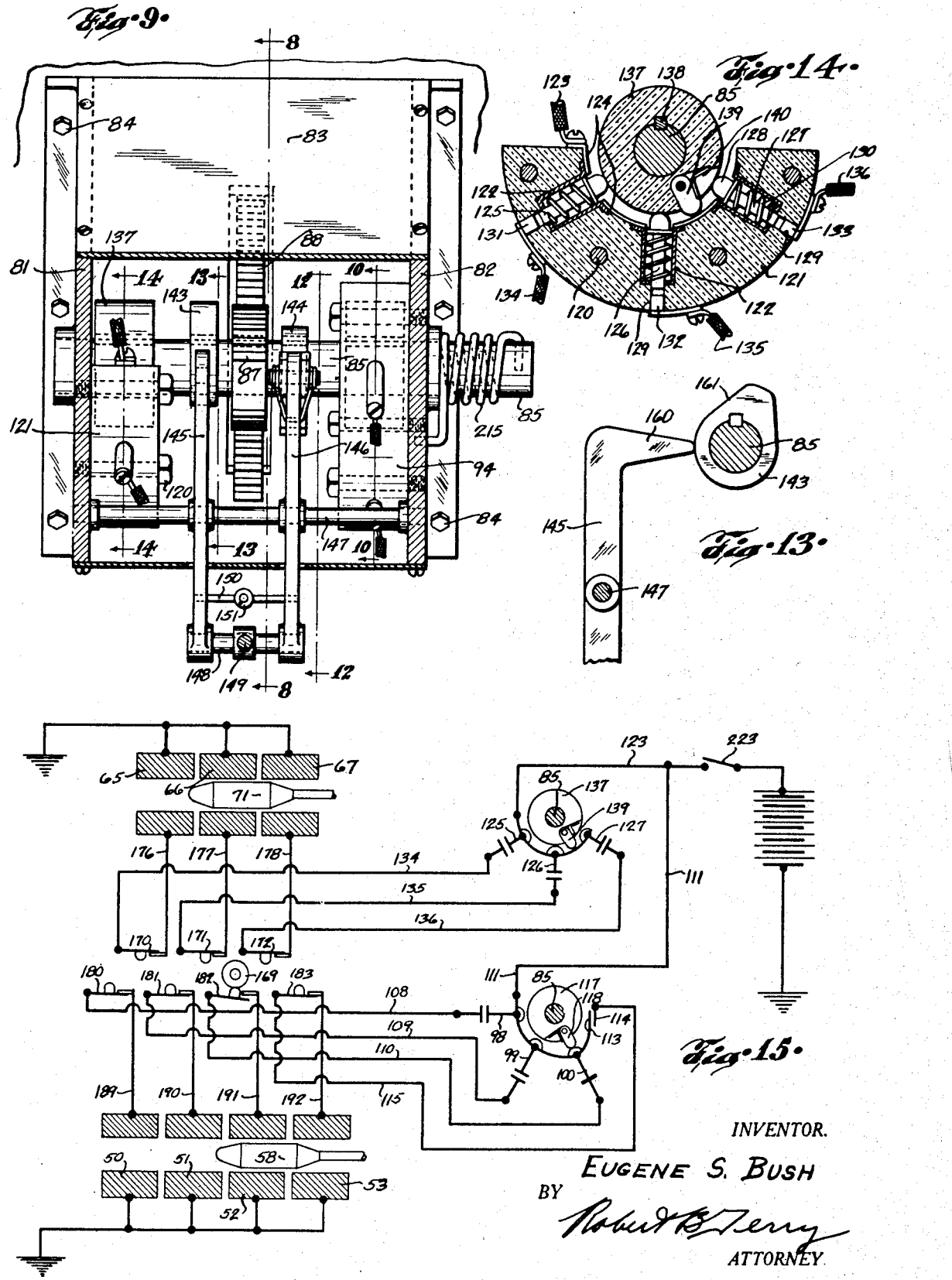
INVENTOR.
EUGENE S. BUSH
BY Robert B. Terry
ATTORNEY.

Patented Apr. 25, 1939

2,155,470

UNITED STATES PATENT OFFICE 2,155,470

COMBINED CLUTCH AND TRANSMISSION CONTROL

Eugene S. Bush, St. Louis, Mo., assignor to Bush Manufacturing Company, St. Louis, Mo., a corporation of Missouri Original application July 9, 1934, Serial No. 734,328. Divided and this application March 10, 1937, Serial No. 130,033

15 Claims. (Cl. 192—.01)

This invention relates to improvements in combined clutch and transmission controls, and more particularly to an improved electro-mechanical control mechanism for coordinating speed-change control movements, and the actuation of a clutch operatively employed in the same organization, as in an automotive vehicle. This application is a division of my copending application filed July 9, 1934, and bearing Serial No. 734,328, issued July 6, 1937, as Letters Patent 2,085,789. The subject matter herein disclosed and claimed is structurally related to that of my copending application Serial No. 130,034, filed March 10, 1937.

An object of the present invention is attained in an improved control mechanism whereby it is possible through electro-mechanical means, to operate, coordinately, a clutch and a speed-change transmission, through manipulation of a single manual control member.

Otherwise expressed, an object of the invention is attained in an improved combination of switching mechanism and electrical control units common to a clutch and transmission assembly, for example, of a type for use in an automotive vehicle.

A further object of the invention is realized in a combination including a clutch and transmission, electromagnetic devices for moving the parts thereof into their several control positions, and a novel and improved control and switching arrangement through which the electromagnetic devices are selectively energized.

Yet another object of the invention consists in the provision, in a device of the type mentioned in the preceding object, of automatic circuit-opening means, serving to limit the control movements of clutch and transmission parts, through control of the circuits of the electromagnetic devices.

Figure 4:
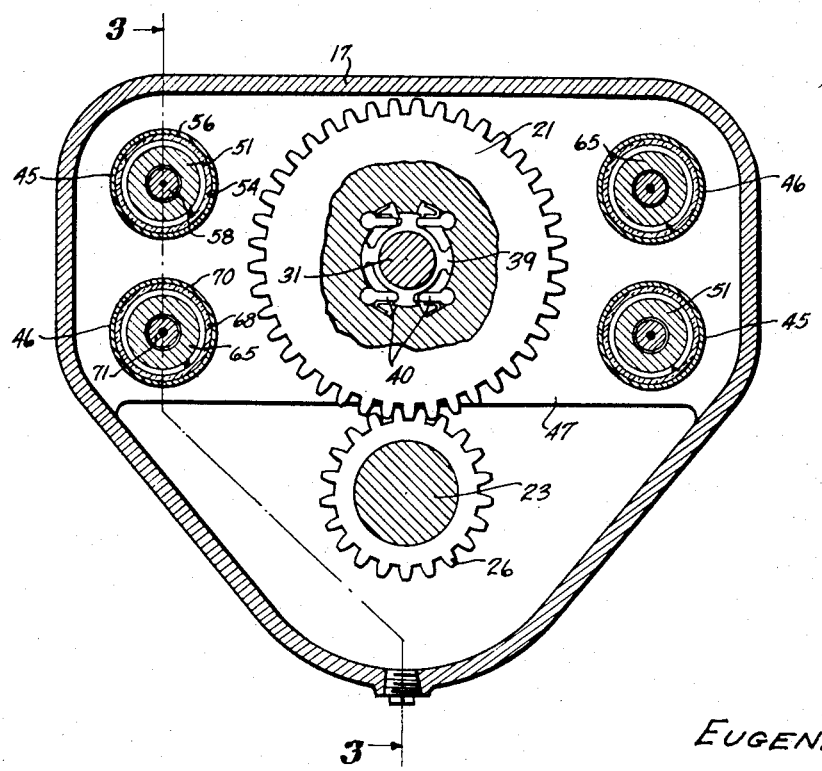
Figure 5:
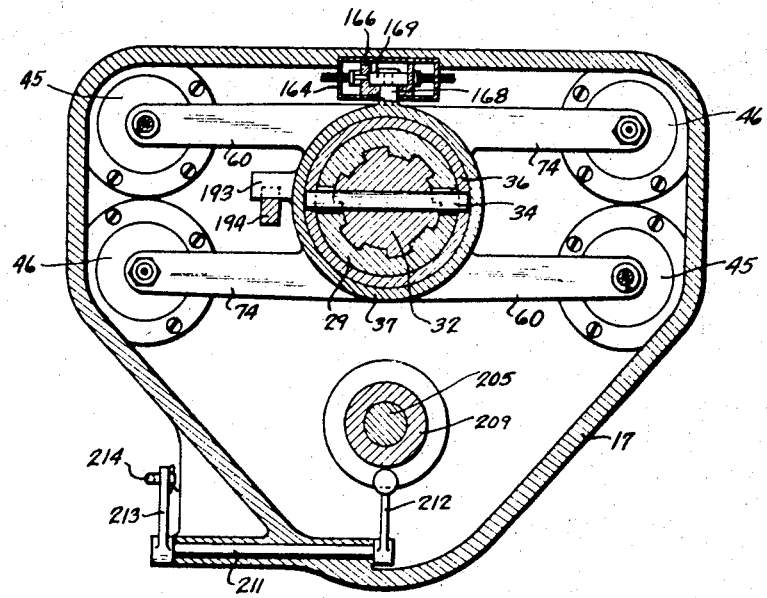
Figure 6:
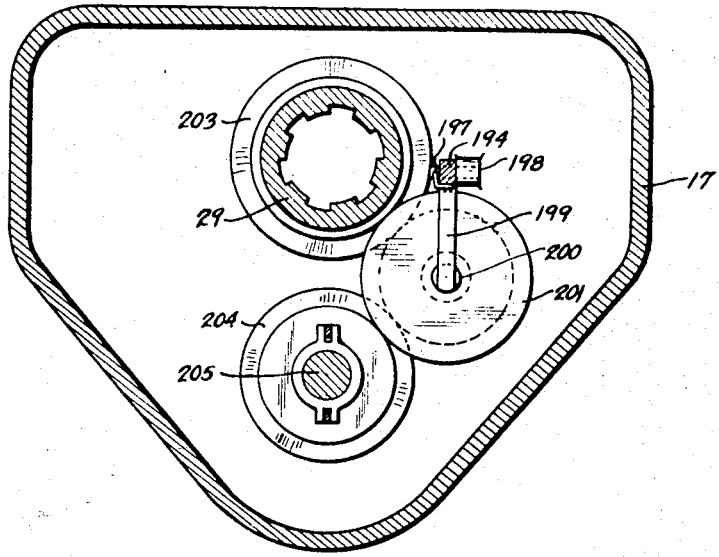
Figure 7:
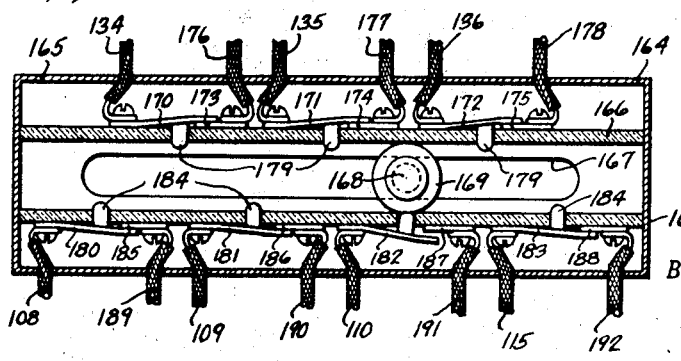

Further objects and advantages of the invention will appear from the following detailed description of. a preferred embodiment of the invention, and from the accompanying drawings, in which:

Fig. 1 is a diagrammatic side elevation, showing a manner of operatively connecting the assembly to the throttle of an internal combustion engine; Fig. 2 is a vertical, longitudinal, sectional elevation of a clutch and transmission to which the present invention is applied; Fig. 3 is a vertical, longitudinal, sectional elevation, showing a preferred arrangement of electrical control mechanism, Fig. 3 being taken along line 3—3 of Fig. 4; Figs. 4, 5 and 6 are transverse, vertical sections as viewed along lines 4—4, 5—5 and 6—6, respectively, of Fig. 2; Fig. 7 is an enlarged, horizontal sectional view of a form of a circuit breaking device, as taken along line 7—7 of Fig. 2; Fig 8 is a sectional view of a presently preferred form of manual control switch and throttle control assembly, the view being taken along line 8—8 of Fig. 9; Fig. 9 is a vertical section as viewed along line 9—9 of Fig. 8; Fig. 10 is a sectional view through one of the switch units, as taken along line 10—10 of Fig. 9; Fig. 11 is a sectional elevation of the switch unit of Fig. 10, as viewed along line 11—11 of Fig. 10; Figs. 12 and 13 are sectional elevations of the throttle control elements, these views being taken along lines 12—12 and 13—13, respectively, of Fig. 9; Fig. 14 is a section through another of the switch units, as viewed along line 14—14 of Fig. 9; Fig. 15 is a wiring diagram showing the connection of the several switches, circuit breaker and solenoids, and Fig. 16 is a section taken along line 16—16 of Fig. 8.

The transmission and clutch assembly shown in Fig. 2 constitutes, apart from combinations presently disclosed and claimed, no part of the present invention, but is described and claimed in my Patent No. 1,947,033 issued February 13, 1934. It may be noted for purposes of the present description that connection is made to a drive shaft 5 of an engine or other prime mover, through a flanged hub 6, extended to form an element 7 of a friction clutch assembly. Companion plates or discs of the clutch are indicated at 8 and 9, the clutch being engageable and disengageable through a plurality of radially movable plungers, some of which, indicated at 10, are provided with hinged inner ends 11, and others, such as plungers 12, being of relatively rigid construction, and somewhat less in length than the plungers 10. Clutch elements 7 and 9 are biased apart as by springs 13, and the plungers are biased inwardly toward clutch-disengaging position as by springs 14. The clutch actuating assembly is carried internally of a housing 15, mounted on a hollow rotatable power shaft 16, and extending within the transmission case 17. The clutch and clutch-actuating mechanism are preferably enclosed by a housing 18 suitably secured to the engine frame and the transmission case 17.

The speed-change gearing of the transmission presently illustrated is identified with a plurality of aligned, spaced, centrally hollow gears 19, 20, 21 and 22, these gears being so assembled as to form a continuous passage or bore therethrough, for a purpose hereinafter appearing. Carried by a countershaft 23 are a plurality of gears 24, 25, 26 and 27, each of gears 24 through 27 being secured to the shaft 23, and the gears 24 through 26 meshing respectively with gears numbered 19 through 21. The gear 27 constitutes a reverse driving gear, and operates through an idler 28 to actuate the gear 22 as appears in Fig. 2.

The power take-off shaft, or driven element which may serve as a connection to the propeller shaft of an automotive vehicle, is indicated at 29, and is provided throughout its forward end with a longitudinal bore 30 in which there is disposed for endwise movement, a combined transmission and clutch-controlling shaft, and shiftable power member indicated at 31. The shaft 31 is provided with an externally splined head 32, the splines thereof engaging corresponding internal splines 33 within and along the bore 30 of shaft 29. By this provision, even though the shaft 31 is moved endwise for speed change control, as hereinafter appears, this shaft is always kept in rotative, operative connection with the propeller shaft 29.

As a means for effecting endwise movements of the shaft 31 for purposes of coordinated control of the clutch and speed-change elements of the transmission, as hereinafter described, there is employed an arrangement shown in Figs. 2 and 5 as consisting of a transverse pin 34, projecting through the splined head 32 of the shaft 31, thence through diametrally opposed slots 35 in the hollow portion of shaft 29, and outwardly to terminate in a rotating collar 36. The collar 36 is surrounded by a circular non-rotatable collar 37 adapted for longitudinal movement by means hereinafter described. The arrangement is such that, as the collar 37 is moved endwise, there results an endwise movement of shaft 31.

The shaft 31 is provided with a driving head 38 characterized by a plurality of radial abutments or projections 39 which serve, when the driving head is brought to a position within one of the gears 19, 20, 21 or 22, to be engaged by spaced spring-pressed pawls 40, there being preferably at least a pair of such pawls within each of the gears 19–22, and the arrangement being such that the driving head 38 may be freely moved through or into any of the gears 19–22, due to outward or radial displacement of the pawls and abutments 39. The arrangement is further such that when the head 38 is positioned in driving engagement with the center pockets in any one of the gears 19–22, the abutments 39 and pawls 40 coact to establish a driving connection between the selected gear and the shaft 31.

The shaft 31 serves also the purpose of actuating the friction clutch plates 7, 8 and 9 coordinately with, and preferably in sequence with the establishment of the several operative connections with the gears 19–22. Clutch actuation is effected through a series of cams or nodes 41, spaced along the left hand end (Fig. 2) of shaft 31, their spacing being proportioned to the spacing between centers of the gears 19–22. The relation between the cams 41 and gear-engaging head 38 is preferably such that as shaft 31 is moved to the left (Fig. 2), the head 38 serves to bring one of the gears 19–22 into driving engagement with the shaft, slightly in advance of engagement of the friction clutch. This clutch actuation is effected, as will appear from the drawing, by outward radial movement of one group of plungers, such as 10, responsively to movement of one of the cams 41, into the plane of the plungers.

It will appear from the foregoing that a longitudinal movement of the collar 37 serves to effect both a full transmission control, consisting of the several predetermined speed-change settings, and serves also to effect, coordinately but sequentially therewith, a series of clutch-engaging and -disengaging movements.

Due to the resilient mounting of the pawls 40, the driving head 38 is free to move without obstruction to its control movement, into or through the gears 19–22. As before noted, a plurality of the clutch-actuating plungers 10 are provided with hinged inner ends 11, there being also provided a separate group or set of plungers 12, somewhat shorter in length than the plungers 10. It will appear that the endmost clutch cam 41 is also of greater diameter than those disposed inwardly of the ends of shaft 31, with the result that only the larger clutch cam actuates the shortest plungers such as 12, and that this takes place only when the shaft 31 is positioned to bring the driving head 38 into driven engagement with the reverse gear 22. In the forward speed positions, due to the hinged inner ends 11 of plungers 10, the smaller clutch heads or cams 41 actuate the plungers 10, and hence the clutch, in sequence, only as the shaft 31 is moved to the left (Fig. 2) as in proceeding from the lower, to and through the higher gear ratios. Upon the reverse movement of shaft 31, the hinged inner ends 11 of plungers 10 are deflected laterally, to the right, and thus the clutch is not engaged sequentially during movement of the shaft 31 from higher to lower gear ratios.

There is provided within the transmission housing, paired solenoid assemblies 45 and 46, each of which is shown as mounted at one end in a bearing bracket 47, the bracket also serving to carry hollow gears 20 and 21. The opposite ends of the solenoid assemblies are secured in bearing bracket 48 which forms a bearing support for the hollow gear 22, one end of shaft 29, and an end of gear shaft 23. The bearing bracket 48 is so constructed as to retain all lubricant in the gear compartment of the case. The solenoid units of assembly 45 include hollow elements 50, 51, 52 and 53 (Fig. 3) which are surrounded on their outer periphery by suitable magnet windings or coils, and are suitably insulated from each other by insulating material 54, and are enclosed, except for end 55, by a case 56, this case 56 being suitably secured to bearing bracket 48. As will appear, the mounting of the magnet assemblies facilitates their detachment and replacement if desired for purposes of access and service. It will be seen from Fig. 3 that, due to the use of hollow magnets, there results a passage 57, which is, by preference, open at one end, and which extends through the several magnets. Positioned for longitudinal movement in passage 57 is a magnet core or armature 58 having a reduced extension 59 projecting out of passage 57. The core extension 59 is mounted in or secured to a projecting arm 60 of the non-rotatable collar 37, and has a limited endwise movement relative to arm 60, as determined by a compression spring 61 and nut 62 on one side of arm 60, and an abutment 63 on the opposite side.

It will be seen from the foregoing description that, as a sequential energization of the magnets is effected, the core 58 will be drawn along the passage 57, and since the core is connected to collar 37 by extension 59 and arm 60, such actuation of the core will move the collar along the shaft 29. Moreover, as the collar is connected to shaft 31, there will be a corresponding movement of driving head 38 and clutch operating cams 41. The purpose of the lost motion arrangement identified with the spring 61 is to allow a slight initial starting movement of the magnet core, relative to arm 60, so that as one of the magnets is energized, the core will have partly entered the energized magnet before it picks up the full load of speed change and clutch operation. A guide rod 64 projecting through a longitudinal opening in the core 58 and extension 59, with its ends secured in the bearing brackets 58 and case end wall, is provided as a guiding means for centering the core in the magnets.

The spacing of the magnets in the assemblies 45 is such that when one magnet is energized to draw the core 58 into the magnet, the resulting movement of the shaft 31 first brings the driving head 38 into engagement with a pre-selected gear, and then effects an engaging actuation of the clutch. For example, when magnet 52 is energized, drawing the core into it, there is a proportionate or corresponding movement of driving head 38 to bring the driving head into engagement with gear 21, thus effecting a low driven speed of shaft 29, this relation of parts being illustrated in Figs. 2 and 3. Upon energization of magnet 51, drawing the core to the left, Fig. 3, there is a movement of driving head 38 and cams 41 to the left, Fig. 2, the driving head 38 being moved out of gear 21 and into driving relation with gear 20, and at the same time the arrangement of cams 41 causes, in sequence, disengaging and engaging operations of the clutch. This relation of parts now effects a second or intermediate speed of the driven shaft. Upon energizing magnet 50, the resulting movement of shaft 31 will bring driving head 38 into driving relation with gear 19, thus effecting a direct drive or high speed of the driven shaft. When it is desired to effect a reversing drive through the transmission assembly, the reverse magnet 53 is energized, the driving head 38 being moved into engagement with gear 22, from which, due to the provision of idler gear 28, there results a reverse movement of driven shaft 29.

It will be seen from the foregoing that, as the magnets 52, 51 and 50 are energized in sequence, there will result a series of speed change movements. The construction of the solenoid assembly 46 is much the same as the units 45, except as to the number and position of the magnets. The hollow elements 65, 66 and 67 are surrounded by magnet coils or windings which are insulated by suitable insulating material 68, and which are enclosed except at end 69, by casing 70. The assembly 46 is mounted in bearing brackets 47 and 48, after the manner of the assembly of units 45.

Magnet core or armature 71 is positioned to move in passage 72, and has an extension 73 mounted in arm 74 of collar 37. A compression spring is positioned between arm 74 and an abutment 75 on extension 73, a nut 76 being provided on the opposite side of arm 74 to hold the parts in assembled relation. The spring allows a slight lost motion of extension 73 in arm 74, so that the magnet core 71, upon energization of one of the coils, will move a short distance into the magnet before it takes the full load of shifting the shaft 31 and associated parts. It will be seen that upon energization of a magnet, the magnet core 71 will be drawn toward and into the magnet, thereby effecting endwise movement of the collar 37, shaft 31, driving head 38, and clutch operating cams 41.

Magnets 65, 66 and 67 are so positioned and spaced that upon energization of any one of them to receive the core in its intended position, the driving head 38 will be brought into a neutral space between the pawls 40 of the adjacent gears. Thus when magnet 67 is energized to draw core 71 into it, the driving head 38 is moved to a position between the pawls of gears 21 and 22, thus effecting a neutral or free running position between low speed and reverse positions of the driving head. Energizing magnet 66 brings the driving head 38 into a neutral or free running position between the pawls of gears 20 and 21, or between second or intermediate speed and low speed. Upon energizing magnet 65, the driving head 38 is brought into a neutral or free running position between gears 19 and 20, or between high and second speeds.

It will be seen from the foregoing that the solenoid units of assembly 45 are adapted for effecting driving relation between pre-selected gears of the transmission, while the axially staggered relation of units of assembly 46 results in successively effecting neutral positions of the driving head 38.

Proceeding now to a description of the throttle control and the switching mechanism for selectively energizing the solenoids, there is secured to a support 80, which may consist of a floor board of an automobile, a casing which consists of side plates 81 and 82 and a cover 83, the side plates being secured to the floor board as by bolts 84. Journalled in the side plates 81 and 82 is a shaft 85, on which is mounted as by a key 86, a gear 87, the teeth of gear 87 meshing with a toothed rack 88. The rack 88 is carried by an extension 89 of a pedal 90, and braced by a member 91, which may also be a part of the pedal. The pedal 90 is pivoted on a pin 92 carried by a member 93, the member 93 being suitably secured to the floor board 80. It will be seen that the pivot point is so positioned longitudinally of the foot pedal that when a downward pressure is applied to the forward portion of the pedal, the gear 87 will be rotated in a clockwise direction (Fig. 8), and that when a downward pressure is applied to the heel or rear portion of the pedal, the gear will be rotated in an anti-clockwise direction.

Mounted on the side plate 82 is a switch mechanism which controls the operation of the solenoid units of assembly 45. This switch mechanism comprises a body portion 94, preferably of insulating material, and is secured to the side plate 82 by bolts 95, the body portion 94 being provided with recesses 96 to receive metal cups 97 (Fig. 10). Mounted in cups 97 are switch elements or plungers 98, 99 and 100, the outer ends of the plungers projecting into apertures 101 in the body portion 94, and the opposite or inner ends terminating in button portions 102. There are provided in the cups 97 compression springs 103, which urge the switch elements or plungers 98, 99 and 100 inwardly, and into switch open position, as will hereinafter appear.

Projecting into the apertures 101 from the outer periphery of the body portion 94 are switch contacts or plungers 104, 105 and 106, these plungers being urged inwardly by flat springs 107 secured to the body 94. Conductors 108, 109 and 110 serve to connect the plungers 104, 105 and 106, respectively, to the coils or windings of the magnets 50, 51 and 52 respectively, of the solenoid assembly 45, as will be more fully hereinafter described. A lead or conductor 111, from a suitable source of electrical energy, such as a battery, is connected to the individual cups 97 through metal strips 112, one of the strips being extended to form a contact button 113. A companion button 114 (Fig. 11) is extended through the body portion 94 to receive a conductor or conduit 115, this conduit 115 being connected to the coil of the reverse magnet 53 of solenoid assembly 45.

Located within the body portion 94, and secured to the shaft 85 as by a key 116, is a cylindrical collar or switch rotor 117, preferably formed of insulating material, this collar 117 serving to carry a spring pressed pawl 118, urged outwardly or into operative position as by a spring 119. It will be seen that as the shaft 85 is rotated in a clockwise direction, as a result of a downward pressure on the forward portion of foot pedal 90, the pawl 118, carried by collar 117, will, in the proper sequence, strike button portions 102 of switch elements 100, 99 and 98, urging these elements outwardly to contact with switch contacts or plungers 106, 105 and 104, respectively. Normally, the switch plungers 100, 99 and 98 are held out of switch engaging position by the inward pressure of springs 103. It will also be seen that, as shaft 85 and collar 117 are rotated in the opposite or anti-clockwise direction, the pawl 118 will swing against the spring as it passes over the plunger buttons 102, thus allowing the switch elements to remain in open position, and as the collar is further rotated, the metal pawl 118 will bridge contact buttons 113 and 114 (Fig. 11) to effect a closed circuit to the core of the reverse magnet 53.

Secured to the plate 81 as by bolts 120, is a switch structure comprising a body portion or switch housing 121, preferably of insulating material, the housing serving to receive cups 122 which are suitably connected to a source of electrical supply, as by a conductor 123 and metal strips 124. Carried in cups 122 are contact plungers 125, 126 and 127. The inner ends of the plungers terminate in button portions 128, and the outer ends project into apertures 129, springs 130 being provided to urge the plungers inwardly. Projecting into the apertures 129 from the periphery of the body portion 121, are spring-pressed switch plungers 131, 132 and 133, from which connection is made, as by conductors 134, 135 and 136, respectively, to the coils of the magnets 65, 66 and 67, respectively, of the solenoid assembly 46.

Located within the body portion 121 is a collar or switch rotor 137 secured to the shaft 85 as by a key 138, this collar carrying a spring-pressed pawl 139 urged outwardly by a spring 140. It will be seen that as the shaft 85 and collar 137 are rotated in an anti-clockwise direction, the pawl 139 will strike the button portions 128, and in sequence will force the plungers 125, 126 and 127 outwardly into switch closing relation to the spring-pressed plungers 131, 132 and 133, respectively, thus effecting, at the proper moments, energization of the coils of the magnets 65, 66 and 67, respectively, of solenoid assembly 46.

Suitably secured to the shaft 85, and located on opposite sides of gear 87, are throttle control cams 143 and 144, the cam 143 controlling the engine speed when the transmission is in reverse position, and the cam 144 controlling the engine speed when operating in a forward motion, as hereinafter explained. The cams 143 and 144 control the engine speed through cam follower levers 145 and 146, respectively, these levers being secured to a shaft 147 which is suitably journalled in the side plates 81 and 82. Mounted in apertures in the lower ends of the levers 145 and 146 is a tie-piece 148 to which is secured a throttle control rod 149, in turn suitably connected to an engine speed control device, for example, the throttle of a suitable carburetor (Fig. 1). Located below the pivot 147, and carried by the levers 145 and 146, is a cross rod 150 which receives one end of a tension spring 151 (Fig. 12), the opposite end of spring 151 being secured to a stationary member 152 carried by the casing cover 83. This spring tends to maintain the cam followers in contact with the cams.

Mounted on the upper portion of the follower lever 146, as by pivot pin 153 (Fig. 12), is a follower arm 154, as illustrated in Fig. 12. This arm 154 is urged outwardly toward a stop 155, by a torsion spring 156. The follower arm 154 is adapted to be engaged and moved to the left (Fig. 12), by camming surfaces 157, 158 and 159, on the cam 144, when the cam is rotated in a clockwise direction, but when the shaft and cam 144 are rotated in an anti-clockwise direction, the follower arm 154 will move inwardly about its pivot 153 so as not to cause displacement of the lever 146, and thus under these conditions, not affecting the speed of the engine.

The cam follower arm 145 is provided with a cam follower portion 160 which rides on the surface of cam 143, this cam including a nose or camming portion 161, which when the shaft and cam are rotated in an anti-clockwise direction, will urge the follower lever 145 to the left, Fig. 13.

It will be observed that spring 151 (Fig. 12) will serve to bias the arm 145 and hence follower 160 into engagement with cam 143 in the same manner that this spring influences the arm 146. The cam 143, particularly the nose 161, is in such timed relation to the cam 144, that the nose 161 is inoperative during operative positions of cam 144, the high point of cam 143 coming into operative relation with its follower only during a predetermined extreme counter-clockwise rotation of shaft 85.

The operation of the switches and throttle control cams and levers, just described, will be more fully hereinafter explained.

Suitably secured within a portion of the transmission case 17 is a circuit-breaking or limit-switch structure, indicated generally at 164, the details of which are best illustrated in Figs. 5 and 7. The structure 164 includes an outer casing 165 having a longitudinal slot along its lower wall and enclosing the switch and switch mountings. Inside the case 165, and secured thereto is a switch carrier member 166, preferably formed of insulating material, and longitudinally slotted as at 167, to receive an extension 168 of the non-rotatable collar 37. A roller 169 carried by the extension 168 is arranged to operate in the recess or passageway formed between the side walls of the carrier 167, and to open one at a time, the several switches hereinafter described, the roller 169 among other elements, also serving to hold the collar 37 from rotating with shaft 29.

Mounted on one outer side of the switch carrier are switch contacts 170, 171 and 172, connected, respectively, by conductors 134, 135 and 136 to the switch plungers 131, 132 and 133. Mounted on switch contacts 170, 171 and 172 are plunger buttons or projections 179, the plunger buttons projecting through and beyond suitable apertures in a side wall of the switch carrier 166 to cause an outward movement of the switch elements as the roller 169 is moved longitudinally of the structure. Paired with switch contacts 170, 171 and 172 are companion contacts 173, 174 and 175, respectively, which are connected by conductors 176, 177 and 178 to the coils of the magnets 65, 66 and 67, respectively, of the solenoid assembly 46. These paired contacts are normally held in circuit closed position, but depending on the longitudinal position of roller 169, which urges the plunger buttons 179 and thus the switch contacts 170, 171 and 172 outwardly, the circuit including each magnet coil is at times broken, as will be more fully understood from later description.

Mounted on an opposite outer side of the carrier 166 are a plurality of switch contacts 180, 181, 182 and 183, these contacts being connected by conductors 108, 109, 110 and 115 to the switch elements 104, 105, 106 and 114, respectively, of the switch structure which energizes the windings of the solenoid assembly 45. Secured to each of the switch contacts 180, 181, 182 and 183 is a plunger 184, these plungers extending through and beyond suitable apertures in a side wall of the switch carrier and into the path of the roller 169, to cause an outward movement of the switch contacts as the roller 169 is moved longitudinally of the structure. Paired in the order named with the switch contacts 180, 181, 182 and 183, are companion contacts 185, 186, 187 and 188, the latter being connected, as by conductors 189, 190, 191 and 192, respectively, to the coils of the magnets 50, 51, 52 and 53, of the solenoid assembly 45. The several paired contacts are normally held in closed position by their own spring pressure, but when, by a predetermined movement of roller 169, one of the plungers 184 of the several switch contacts 180, 181, 182 and 183 is moved outwardly, there results an open-circuit relation, the purpose of which will be hereinafter explained.

As a means for synchronizing the engine speed with the speed of the driven shaft, when the transmission elements are moved from second speed into high speed or direct drive, or when the parts are moved out of high speed into a free running position, there is provided a governor-operated throttle control. The governor throttle control mechanism, best illustrated in Figs. 2, 3, 5 and 6, is brought into and out of operation by a lug 193 projecting from a side portion of the nonrotatable collar 37 to ride upon an upper face of a camming arm 194. The arm 194 is provided with cam portions 195 and 196 at its forward end, and is pivoted at its opposite end on a pin 197 carried by a projecting portion 198 of an end wall of the transmission case 17. A suitable torsion spring maintains the camming arm 194 in sliding relation with lug 193. Depending from the pivot end of arm 194 is an extension 199, terminating in a ball portion 200, which rides in a companion socket of a rotatable clutch disc 201, the outer periphery of the disc 201 being beveled or cone shaped to serve as a clutch face. The disc 201 is provided with an axial projection 202 journaled in a suitable recess in an end wall of the case 17, a spring 202A being provided therein to bias the disc 201 forwardly or out of engagement with companion disc elements 203 and 204. The cone disc 203 is secured to the driven shaft 29, and the disc 204 is journaled on a shaft 205, suitably secured against rotation in an end wall of transmission case 17. Pivoted to one face of disc 204 are governor arms 206, the outer ends of the arms being provided with governor balls 207 and companion arms 208. The arms 208 are pivotally secured to a peripherally grooved collar 209 journaled on the forward end of shaft 205. Located on shaft 205, and between the collar 209 and disc 204, is a compression spring 210 which tends to oppose the centrifugal action of balls 207, and to urge the collar 209 forwardly along shaft 205. Journaled in a side wall of case 17 is a shaft 211, the inner end of which carries a lever 212, the upper portion of the lever 212 being provided with a ball end, adapted to ride in the groove of collar 209. The outer end of shaft 211 carries a lever 213 which is connected as by a rod 214 (Fig. 1) to an engine speed control device, which may consist of the usual throttle valve of an automotive carburetor.

It will be seen from the described arrangement that, as the lug 193 on collar 37 strikes either of the cam surfaces 195 or 196, the cam lever 194 will be urged downwardly to pivot about pin 197 and urge the disc 201 into engagement with companion discs 203 and 204. Since the disc 203 is driven by the driving shaft 29 of the transmission, there will result a proportionate or corresponding rate of rotation of disc 204. As the disc 204 is rotated, the governor balls will swing outward, away from shaft 205, drawing the collar 209 toward disc 204, thus causing an endwise movement of the throttle control rod 214, through lever 213, shaft 211 and lever 212, in a direction to accelerate the engine to a speed proportionate to the speed of the driven shaft 29. When the disc 201 is disengaged from driving connection with discs 203 and 204, the spring 210 will urge the collar 209 forwardly along the shaft 205, thus decelerating the engine except as it may be otherwise controlled through the pedal or an auxiliary control.

The operation of the device is thought to be apparent from the foregoing description of parts, but may be briefly reviewed for sake of completeness as follows:

Assuming, for example, the control mechanism to be in a neutral position between low speed and reverse, and that it is desired to drive the associated vehicle in low speed, foot pedal 90 is pressed downwardly, the rack 88 then rotating gear 87 in a clockwise direction (Fig. 8), also rotating the switch members 117 and 137 and throttle control cams 143 and 144. The switch member 117 is rotated until pawl 118 strikes the button of switch plunger 100, pressing the plunger outwardly, closing the circuit through conductors 111, 110, switch contacts 182, 187, and conductor 191, to energize the coil of magnet 52, thus drawing the magnet core 58 to the left (Fig. 3) to a position within the magnet 52. Since the core 58 is connected to collar 37 through extension 59 and arm 60, there is a corresponding movement to the left (Fig. 2) of driving shaft 31, bringing the head 38 into driving engagement with pawls 40 of gear 21, and thereafter engaging the clutch through plungers 10 which are urged outwardly by one of the several cams 41, as shown by Fig. 2. Driving now takes place through driving shaft 5, clutch plates 7, 8 and 9, hollow shaft 16, gears 19 and 24, shaft 23, gears 26 and 21, thence through shaft 31, and out through driven shaft 29. With this arrangement of transmission parts, there results a low speed rotation of driven shaft 29.

As the collar 37 is moved to the left (Fig. 2), as appears above, there is a corresponding movement of roller 169 in the circuit-breaking structure 164. The parts are so arranged that as the driving head 38 has been brought into engagement with gear 21, and the clutch has been engaged, the roller 169 strikes the plunger 184 on switch element 182 and urges the plunger and corresponding spring switch arm outwardly, thus breaking the contact between switch elements 182 and 187, thereby interrupting the circuit to the coil of magnet 52. This means for breaking the circuit serves to limit the movement of the core at the end of this stage of its operation, and prevents any unnecessary load being drawn from the source of power, such as a battery, in case the transmission control parts are allowed to remain, either through inadvertence or necessity, in first speed. This relation of transmission parts and switch assemblies is shown, for sake of conformity throughout the drawings, it appearing that similar provisions serve to limit the current consumption by the coils corresponding to other control positions.

A further downward pressure on the foot pedal will cause the camming surface 57 of cam 144 to engage the cam follower 154 and urge the lever 146 outwardly, which, through the throttle rod 149, will gradually increase the engine speed until such a speed of the driven element has been reached as is most desirable in contemplation of the next higher gear ratio. A further downward movement of the foot pedal 90 will cause the cam follower to ride over the high end of camming surface 157 and onto the low portion of camming surface 158, effecting a deceleration of the engine to a speed suitable for entering the next higher gear ratio. At the same time, the last mentioned movement of the foot pedal 90 will cause the pawl 118 on collar 117 to engage the button portion of switch plunger 99, closing the circuit through conductors 111, ª109, switch contacts 181, 186, and conductor 190 to energize the coil of magnet 51.

The magnet core 58 is now drawn to the left, Fig. 3, out of magnet 52 and into a position within magnet 51. The movement of core 58 and shaft 31 to the left (Fig. 2), first disengages the clutch, moves the driving head 38 out of engagement with the pawls in gear 21 and into engagement with pawls 40 of gear 20. This movement finally results in engaging the clutch to effect a drive through shaft 5, clutch plates 7, 8, 9, shaft 16, gears 19 and 24, shaft 23, gears 25 and 20, through driving head 38, shaft 31, and out through shaft 29. With this arrangement of transmission parts, there results a second or intermediate speed of the driven shaft. The roller 169 is moved to the left by collar 37, through a distance proportionate to the distance between centers of the pawls of gears 21 and 20, the roller striking the plunger 184, on the switch contact 181, and breaking the circuit between conductors 109 and 190. As the transmission parts are being moved as described, the throttle-controlling cam follower 146 rides off the high end of camming surface 157 and onto the low end of camming surface 158. The contour of surface 158 is such that upon further downward movement of pedal 90, the engine, and thus also the driven element are increased in speed. However, due to the radius of the lower end of camming surface 158, the engine is not brought back to idling speed when the follower rides off of surface 157, but is maintained at such a speed as best to relate it to the speed of the driven shaft, so that after the gear change has been effected and the clutch brought into engagement, there will not be any jar or shock such as might be experienced if the speeds of the engine and driven element were not appropriately related when the clutch is brought into engagement.

Under certain driving conditions, it may be desirable, when the vehicle is operating in any of the lower speed ratios, for example intermediate, to provide for acceleration of the engine beyond a speed determined by cam surface 158 of cam 144. To care for any such requirement I have provided a master switch, which may be of any suitable form, and serves at the will of the operator to energize or deenergize the entire electromagnetic system. Such a switch is shown diagrammatically in Fig. 15 at 223, and in Fig. 22 at 224. By deenergizing the magnet coil circuits through one of these switches, the operator may, having set the transmission and clutch control elements say in second gear positions, open the switch, and proceed to accelerate by further depression of the pedal, utilizing the cam portion 159, and attaining if desired a full engine throttle. Such requirement may be encountered for example, in hard pulls in heavy soils, or be met in a need for augmented acceleration on grades, etc. Upon reclosing the switch and reenergizing the magnet coil circuits, further selection of clutch and transmission positions may be effected.

Upon further downward movement of foot pedal 90, the pawls 118 of collar 117 strike the plunger 98 urging it into switch closing position. The current now passes through conductors 111, 108, contacts 180, 185, and conductor 189 to energize the coil of magnet 50. The magnet 50 attracts the armature or core 58 to its extreme position to the left, and the core correspondingly moves shaft 31 to the left (Fig. 2), first disengaging the clutch and moving the driving head 38 out of engagement with the pawls of gear 20 and into engagement with pawls 40 of gear 19, and thence again engaging the clutch through plungers 10 and one of the cams 41. Driving now takes place through shaft 5, clutch plates 7, 8, 9, hollow shaft 16, gear 19, driving head 38, shaft 31, and out through shaft 29. This position of transmission parts corresponds to, and results in a high speed or direct drive relation between the engine and the driven shaft. As the collar 37 is moved to the left a distance to correspond to the distance between the centers of the pawls of gears 20 and 19, the roller 169 on collar 37 is brought into engagement with plunger 184 of switch contact 180, thus urging this contact outwardly and breaking the circuit between conductor 189 and 108.

As the transmission parts are being moved in the manner last described, the throttle-controlling cam follower 154 rides off of the high end of camming surface 158 and tends to drop onto the lower end of the camming surface 159. But at this time the movement of the collar 37 to the left (Fig. 3), causes the extension or arm 193 to strike the camming surface 195 of lever 194, urging the lever downwardly, thus to urge the clutch disc 201 to the right (Fig. 3), into engagement with companion discs 203 and 204. The disc 203 on the driven shaft 29 rotates the disc 204, through disc 201, to cause rotation of the governor balls 207. The balls will swing outwardly away from the shaft 205, due to centrifugal force, and will draw the collar 209 along the shaft end to the right, Fig. 3. This movement of the collar 209 causes the throttle control rod 214, through lever 213, shaft 211 and lever 212, to operate the throttle in a direction to increase the speed of the engine. It will be seen that, since the engine speed is now related to the speed of the driven shaft 29, the engagement of the clutch, after the driving head 38 has been moved to a direct drive position in gear 19, will cause no jerk or drag which would be experienced if the motor were at idling speed at the time of clutch engagement. However, about the same time that the longitudinal movement of shaft 31 brings about the engagement of the clutch, the extension or arm 193 of collar 37 rides into a low point on the end of the lever 194, thus allowing an upward movement of the lever to bring the disc 201 out of engagement with the discs 203 and 204. This disengagement of the discs makes the governor inoperative, allowing the speed of the motor to tend to drop to an idling speed. It will be seen that the provision of the governor throttle control maintains an engine speed which is properly related to the speed of the driven shaft, as the transmission parts are moved between second speed position and high speed or direct drive. However, once the control parts are in direct drive position, the governor control is out of operation, allowing the engine speed, and thus the car speed, to be fully controlled by the shaft 85 and camming surface 159, through the follower arm 154, lever 146 and throttle rod 149. It is contemplated that free-running operation of the vehicle will usually be effected by disposing the gear clutching head 38 in the neutral position adjacent the pawls of the direct drive gear 19, in which position the head 38 may be readily actuated into and out of conventional, direct-driving position. It will be seen that the described arrangement of parts 193 and 194, co-acting to put the throttle under control of the governor when the control parts are between intermediate and high speed positions, yet taking the throttle out of governor control when in high speed position, serves to maintain the engine and driven shaft in proper speed relation whenever it is desired positively to connect them. There are thus avoided shocks and excessive torsional stresses upon resuming conventional drive following a period of free-running operation.

When it is desired to enter a free-running position, the pressure is removed from the pedal 90, allowing it to move upwardly. This upward movement of the pedal is caused by a torsion spring 215, secured at one end to the shaft 85 and at the opposite end in side plate 82. This spring having been loaded as the gear 87 was previously rotated in a clockwise direction, it will now tend to rotate the shaft 85 and thus the gear, in an anti-clockwise direction. It will be seen that as the pedal is at least partially relieved of pressure, the anti-clockwise rotation of gear 87 will tend to return the pedal to its normal position of rest, which corresponds to a setting of the control parts in a position such that head 38 is disposed in the neutral space between first speed and reverse gears, 21 and 22. However, there is provided a series of notches 216, 217 and 218 along one side of the pedal arm 89, which are adapted to be engaged by a spring pressed plunger 219 conveniently mounted in a recess in the floor board 80, because of which the pedal will only move upwardly until the notch 216 has been engaged by plunger 219. The notches 216, 217 and 218 are so constructed that as they are engaged by the plunger 219, when the pedal is pressed downwardly, there will be little or no resistance against the movement of the pedal, but as the pedal is moving upwardly, the plunger will hold the pedal against further movement until the heel portion of the pedal has been urged downward. As the pedal moves upwardly to a point where the plunger 219 engages notch 216, the switch collar 137 is rotated in an anti-clockwise direction until the pawl 139 strikes the switch plunger 125 to close the circuit through conductors 123, 134, switch contacts 170, 173, and conductor 176 to energize the coil of magnet 65. Magnetic core 71 is drawn to the right (Fig. 3), to a position within the magnet 65, thus drawing the shaft 31 through extension 73, arm 74, and collar 37. This movement to the right (Fig. 2) also serves to move one of the cams 41 out of clutch engaging position and to move the driving head 38 out of gear 19 into a free-running position between the pawls 40 of the gears 19 and 20. The movement of collar 37 to the right will cause the roller 169 to engage the plunger of the switch contact 171, to urge the contact outwardly to a switch-open position, thus breaking the circuit to the coils of magnet 65. In like manner this same movement of collar 37 will cause the arm 193 to engage the cam portion 196 of lever 194, urging the lever downwardly to bring the governor-throttle control into operation to retain the engine at a speed proportioned to the speed of the driven shaft. The governor throttle control remains in operation until the driving head 38 is moved either to a direct drive position, or into a neutral zone between the pawls of gears 20 and 21. It will be seen that the governor throttle control is in operation when the transmission parts are moved from second speed to high speed, and when the parts are in a neutral position between second speed and high speed, so that whenever the driving head 38 is moved into the gear 19, the engine speed will always be properly related to the speed of the driven shaft so as to facilitate resuming drive through the gears.

A slight downward pressure on the heel portion of the foot pedal 90 will disengage the plunger 219 from the notch 216 of the pedal, allowing the shaft 85 to rotate in an anti-clockwise direction until the notch 217 of pedal 90 is engaged by plunger 219. When the parts are in this position, the pawl 139 of collar 137 will strike switch plunger 126 urging the plunger outwardly to a switch closing position, to close the circuit through conductors 123, 135, switch contacts 171, 174, and conductor 177, thus energizing the coil of the magnet 66. The magnet core 71 will be drawn to the right (Fig. 3), to draw the driving head into a neutral position between the pawls of gears 20 and 21. The collar 37 will obviously also be moved to the right to cause the roller 169 to engage the plunger 179 of switch contact 171 and this contact will be urged outwardly to open the circuit to the coil of magnet 66.

If a downward pressure is again applied to the heel portion of the pedal 90, the plunger 219 will be disengaged from notch 217 of the pedal, and the gear 87 and shaft 85 will rotate in an anti-clockwise direction under influence of the spring until the notch 218 of the pedal is engaged by the plunger 219, thus stopping the rotation of the shaft 85. Near the end of this movement, the pawl 139 of collar 137 will strike plunger 127, to urge the plunger outwardly to a switch closing position, thus closing the circuit through conductors 123, 136, switch contacts 172, 175, and conductor 178, to energize the coil of magnet 67. The magnet core 71 will now be drawn to the right to a centered position within magnet 67, drawing with the core, the shaft 31 to move the driving head 38 into a neutral position between the pawls 40 of the gears 21 and 22. The roller 169 will then impinge the plunger 179 of switch contact 172 to urge this contact to a position to open the circuit to the coil of the magnet 67.

It will be noted that as the shaft 31 is moved to the right through its several forward-speed positions, there will be no actuation of the clutch since the hinge portions 11 of clutch operating plungers 10 will swing to the right to allow the cams 41 to pass; it being also observed that there will be no throttle movement due to actuation of cam 144, since the follower arm 154 will swing away in a direction to clear the camming surfaces 157 and 158.

If it now be desired to drive the shaft 29 in a reverse direction, pressure is applied to the heel of the pedal 90 to disengage the plunger 219 from notch 218 and thus to rotate the gear 87 and shaft 85 in an anti-clockwise direction, the pawl 118 of collar 117 is brought to a position to bridge the contacts 113 and 114 (Fig. 11), thereby closing the circuit through conductors 111, 115, switch contacts 183, 188, and conductor 192 to the coil of magnet 53. The magnet core 58 is drawn to the right (Fig. 3), within the magnet 53. This movement of core 58 causes the shaft 31 to move to the right (Fig. 2), bringing driving head 38 into engagement with the pawls of gear 22, and the large end cam 41 into clutch engaging relation to plungers 12. Driving now takes place through drive shaft 5, clutch plates 7, 8 and 9, hollow shaft 16, gears 19 and 24, shaft 23, gears 27, 28 and 22, driving head 38, shaft 31, and out through driven shaft 29, the provision of the gear 28 causing the shaft 29 to be driven in a reverse direction of rotation. As the collar 37 is moved to the right, the roller 169 engages the plunger 184 of switch contact 183 to urge the contact outwardly to a position to open the circuit to the coil of magnet 53. A further rotation of shaft 85 in the same direction will bring the camming surface 161 into engagment with the follower portion 160 of throttle control lever 145, to force the lever outwardly to increase the speed of the engine and hence that of the driven element.

My preference in respect to the return spring 215 on shaft 85, is so to form and anchor the spring that it is stressed upon movement of shaft 85 in either direction about its axis, from the normal position of rest in which the control parts are in a neutral zone between low speed forward and reverse gears. Thus it is seen that with the controls in reverse, if the pedal 90 be permitted to resume its normal position of rest, due to the spring, it will rotate shaft 85 in a clockwise direction to close the switch contact plungers 127 and 133, closing the circuit to the coil of the magnet 53, to bring the driving head 38 into a neutral position between the pawls of gears 21 and 22.

While the foregoing description has covered in detail certain presently preferred embodiments of the invention, it is to be understood that the device may be varied substantially as to the parts shown, their arrangement and combinations, as well as in the intended use of the device, without departing from the full scope and spirit of the invention, as defined by the appended claims.

I claim:

1. In an engine, transmission and clutch assembly, a combined gear-ratio controlling and clutch-actuating member, a shifting element therefor, electromagnets arranged in spaced relation, a plunger operable by said magnets, a connection between the plunger and said shifting element, a control shaft, shaft-operating means comprising a pivoted rack member engaging a pinion on said control shaft, a magnet control switch assembly of rotary type, operated by said control shaft, and a plurality of magnet energizing circuits controlled by said switch assembly, arranged for effecting a sequential energization of the magnets, upon actuation of said rack member in one direction, whereby to effect gear-ratio control, as well as shifting and clutching movements of the first said element.

2. In a coordinated friction-clutch assembly and transmission assembly of constant-mesh gear type including a plurality of gears operatively related to provide different speed ratios, a gear-clutching element movably disposed internally of certain of said gears, means for actuating the friction-clutch responsively to movement of said element, means within the gears, cooperating with the gear-clutching element as it is brought into the several gears to enable driving utilization of a selected gear, and selection of speed ratio, and a plurality of electromagnets together with switches and circuit means therefor, the magnets being arranged and energizable in corresponding pairs on opposite sides of said gear-clutching element and operatively connected to such element and therethrough, the friction clutch actuating means.

3. A transmission assembly of constant-mesh gear type including a plurality of gears operatively related to provide different speed ratios, a gear-clutching element movably disposed internally of certain of said gears, a companion coacting clutch structure within each of the last said gears, selectively engageable by said element to enable selection of speed ratio, a friction clutch assembly controlling the operation of the transmission assembly, electromagnetic means for effecting control actuation of said gear-clutching element and said friction clutch assembly, and a limit switch assembly including a switch-actuating member movable with the gear-clutching element.

4. In a combined transmission and clutch assembly, a control element movable into a plurality of positions to effect changes in transmission speed ratio and to engage and disengage the clutch, a plurality of electromagnetic devices corresponding to the speed-ratio positions of the control element, an armature connection between the electromagnetic devices and the control element for effecting actuation of said element, switching means in controlling relation to said electromagnetic devices, and switching means operable responsively to the position of said control element and adapted for determining the range of its control movement.

5. In a transmission and clutch assembly, an element arranged for movement into a plurality of control positions to effect changes in transmission speed ratio and appropriate clutch engagement and disengagement, an electromagnetic device operatively associated with the control element, switching and circuit means adapted to permit energization of selected portions of said device for selectively actuating said element into its several control positions, and switching means operable responsively to the said element, for limiting its range of movement with respect to its several control positions.

6. A transmission and clutch assembly including a plurality of rotatable members operatively related to provide different speed ratios, an element movably disposed internally of certain of said members, a coacting device clutchingly engageable by said element, within the last said members to enable selection of speed ratio according to position of the movable element, a projection on said element providing a mechanical connection therefrom to the clutch, electromagnetic means for actuating said movable element, a limit switch for terminating energization of the electromagnetic means, and arranged for actuation directly by the said element, and switching and circuit means for selectively energizing the electromagnetic means.

7. In a clutch and transmission, an assembly of rotatable members adapted for selective operative interconnection to provide different speed ratios, a control element selectively movable into a plurality of spaced zones corresponding to said speed ratios, a connection from said element for controlling the clutch, a series of selectively energizable electromagnets, spaced proportionately to the spacing of said zones, an armature common to said electromagnets, and means connecting the armature to the control element.

8. In a transmission and clutch mechanism, an assembly of rotatable members adapted for selective operative interconnection to provide different speed ratios, a control element, means connecting the control element to the clutch for controlling delivery of power therethrough, the control element being selectively movable into a plurality of spaced zones corresponding to said speed ratios, and selectively movable into intervening zones in which the transmission is inoperative, a series of selectively energizable electromagnets, spaced proportionately to the spacing of said zones, an armature structure associated with said electromagnets, and means connecting the armature structure to the control element.

9. An electromagnetic control device for an operatively connected clutch and speed change transmission of a type including a longitudinally movable control member, said device including a connection from said member for actuating the clutch, a series of electromagnets spaced proportionately to the spacing of predetermined transmission-control positions of the control member, an armature structure common to, and selectively actuable by the electromagnets, and a lost-motion connection between said armature structure and said control member.

10. An electromagnetic control device for a speed change transmission and clutch mechanism, in which the transmission is of a type including a longitudinally movable control member characterized by spaced transmission control positions, means operatively relating the clutch and said control member, a series of electromagnets spaced proportionately to the spacing of the transmission control positions of said movable member, an armature structure operatively associated with said control member, and selectively actuable by the electromagnets, and additional electromagnetic means operatively associated with said control member, and arranged for movement thereof to at least one position between its said control positions.

11. In a transmission and clutch assembly, an element movable to effect changes in transmission speed ratio, means utilizing the movements of said element to condition the clutch to enable transmission speed changes, a plurality of electromagnets arranged in a row and including a common armature, control connections from the armature arranged to effect clutch and transmission control movements of said element in response to the energization of said electromagnets, a switching device for selecting the electromagnet desired to be energized, and a switching device operable responsively to movement of said element, for determining its control movement.

12. In a variable speed transmission and clutch assembly, a shiftable speed-change and clutch-control member, a plurality of electromagnets, a movable core common thereto, means translating movements of the core to effect reciprocal shifting movements of the said member, means for energizing the electromagnets one at a time, and a limit switch assembly including an element movable in response to shifting movement of said member, for terminating energization of the electromagnet energized to cause the shifting movement.

13. The combination with an automotive engine, speed-change transmission and clutch, of an operating device for the transmission and clutch, including a control member disposed for facultative actuation, power means influenced by said control member for effecting control movements of the transmission and clutch, said means including a plurality of electromagnets, adapted upon selective energization to effect different speed control placements of the transmission, said power means further including a clutch-operating agency under the influence of said control member; and a connection from said control member, in speed-controlling relation to the engine.

14. In an automotive vehicle including an engine, a variable speed transmission and clutch assembly, a shiftable speed-change member, a plurality of electromagnets arranged for selective energization, and means functionally related thereto for translating armature movement of the electromagnets to the speed-change member, an engine throttle control member, and connections from one of said members for actuating the clutch, whereby the engine speed, clutch and transmission may be coordinately controlled through a single control member.

15. In a transmission and clutch operating assembly, an element arranged for movement into a plurality of control positions to effect changes in transmission speed ratio, an electromagnetic device operatively associated with the control element, switching and circuit means adapted to permit energization of selected portions of said electromagnetic device, and associated motion-translation means for selectively actuating said element into its several control positions, a switch operator, together with connections for causing a clutch actuation responsively to preestablished transmission conditions and position of the operator, and limit-switching means for terminating energization of the electromagnetic device, in accordance with a predetermined movement of said control element.

EUGENE S. BUSH.